United States Patent
Cregger

(10) Patent No.: US 10,503,177 B2
(45) Date of Patent: Dec. 10, 2019

(54) ADDITIVE DELIVERY SYSTEM WITH SENSORS

(71) Applicant: Safe Harbor Associates LLC, La Jolla, CA (US)

(72) Inventor: Robert B. Cregger, San Diego, CA (US)

(73) Assignee: SAFE HARBOR ASSOCIATES LLC, La Jolla, CA (US)

(*) Notice: Subject to any disclaimer, the term of this patent is extended or adjusted under 35 U.S.C. 154(b) by 138 days.

(21) Appl. No.: 15/668,021

(22) Filed: Aug. 3, 2017

(65) Prior Publication Data

US 2018/0039288 A1 Feb. 8, 2018

Related U.S. Application Data

(60) Provisional application No. 62/370,417, filed on Aug. 3, 2016, provisional application No. 62/370,394, filed on Aug. 3, 2016.

(51) Int. Cl.
*G05D 7/06* (2006.01)
*G05B 15/02* (2006.01)
(Continued)

(52) U.S. Cl.
CPC ............ *G05D 7/0629* (2013.01); *G05B 15/02* (2013.01); *G05D 11/131* (2013.01); *G01F 1/00* (2013.01)

(58) Field of Classification Search
CPC .... G05D 7/0629; G05D 11/131; G05B 15/02; G01F 1/00; G01F 11/00; G01F 11/10;
(Continued)

(56) References Cited

U.S. PATENT DOCUMENTS

| 4,065,959 A | * | 1/1978 | Richardson | ............ | G01N 11/06 |
| | | | | | 73/54.13 |
| 4,186,592 A | * | 2/1980 | Eirich | ............... | B01F 15/00175 |
| | | | | | 73/73 |

(Continued)

OTHER PUBLICATIONS

Knick international, User Manual Cermat WA160(x) Ceramic Retractable Fitting, 2018, pp. 44, downloaded from the internet at https://www.knick-international.com/export/media/4355.pdf (Year: 2018).*

(Continued)

*Primary Examiner* — Brian W Wathen
*Assistant Examiner* — Olvin Lopez Alvarez
(74) *Attorney, Agent, or Firm* — Kilpatrick Townsend & Stockton LLP

(57) ABSTRACT

An additive management system is disclosed. The system includes an additive selection system, which selects an additive for dispensing into a working fluid. The system also includes an additive dispensing system having a fluid sensing chamber with sensors. The system also includes an additive delivery system, which delivers the selected additive to the additive dispensing system, and a processor which causes the fluid sensing chamber to receive a sample of the working fluid, receives measurement signals from the one or more fluid parameter sensors corresponding with the values of fluid parameters of the working fluid, and determines values for fluid parameters of the working fluid based on the measurement signals. The processor also causes the additive delivery system to deliver the selected additive to the additive dispensing system and causes the additive dispensing system to dispense the selected additive into the working fluid through the fluid sensing chamber.

17 Claims, 6 Drawing Sheets

(51) Int. Cl.
*G05D 11/13* (2006.01)
*G01F 1/00* (2006.01)

(58) Field of Classification Search
CPC .......... G01F 11/14; G01F 15/02; G01F 23/00; G01N 9/04
See application file for complete search history.

(56) References Cited

U.S. PATENT DOCUMENTS

| | | | | | |
|---|---|---|---|---|---|
| 4,797,191 | A * | 1/1989 | Metzner | ............... | A61M 1/16 204/409 |
| 5,224,051 | A * | 6/1993 | Johnson | ............... | G05D 21/02 184/6.14 |
| 5,672,873 | A * | 9/1997 | Yamazoe | ............... | G01N 21/314 250/339.12 |
| 5,866,426 | A * | 2/1999 | Ball | ............... | G01F 23/265 340/620 |
| 7,237,942 | B2 * | 7/2007 | Childers | ............... | B01F 5/0473 366/152.1 |
| 2002/0030102 | A1 * | 3/2002 | Brown | ............... | B67D 7/02 235/435 |
| 2004/0099572 | A1 * | 5/2004 | Evans | ............... | B01J 8/0035 208/113 |
| 2004/0156417 | A1 * | 8/2004 | Siddiqui | ............... | G01N 35/1011 374/45 |
| 2005/0264302 | A1 * | 12/2005 | Mohajer | ............... | G01N 22/00 324/639 |
| 2005/0285060 | A1 * | 12/2005 | Haga | ............... | G01F 23/0061 250/577 |
| 2006/0196529 | A1 * | 9/2006 | Kenowski | ............... | B08B 9/0325 134/56 R |
| 2007/0202603 | A1 * | 8/2007 | Counts | ............... | G01N 1/14 436/43 |
| 2008/0073376 | A1 * | 3/2008 | Gist | ............... | A23G 9/045 222/145.5 |
| 2008/0295615 | A1 * | 12/2008 | Sihalla | ............... | G01N 1/14 73/863.02 |
| 2010/0305499 | A1 * | 12/2010 | Matsiev | ............... | A61B 5/145 604/67 |
| 2011/0126614 | A1 * | 6/2011 | Belitsch | ............... | G01N 11/04 73/54.04 |
| 2011/0189050 | A1 * | 8/2011 | Schlereth | ............. | G01D 11/245 422/28 |
| 2013/0036799 | A1 * | 2/2013 | Silveri | ............... | G01N 27/08 73/61.41 |
| 2013/0167613 | A1 * | 7/2013 | Kokawa | ............ | G01F 25/0061 73/1.73 |
| 2013/0293881 | A1 * | 11/2013 | Tokhtuev | ............... | G01N 21/15 356/246 |
| 2014/0106467 | A1 * | 4/2014 | Hutter | ............... | B01L 3/021 436/180 |
| 2014/0152326 | A1 * | 6/2014 | Zuppiger | ........... | G01N 35/1011 324/663 |
| 2014/0373596 | A1 * | 12/2014 | Wang | ................ | G01F 25/0092 73/1.57 |
| 2015/0285663 | A1 * | 10/2015 | Schneider | ........... | G01N 27/283 73/431 |
| 2015/0306555 | A1 * | 10/2015 | Richards | ............... | A01J 7/04 424/661 |
| 2016/0018347 | A1 * | 1/2016 | Drbal | ................... | A61M 1/288 210/647 |
| 2016/0024667 | A1 * | 1/2016 | Shanahan | ............... | C25B 1/26 205/335 |
| 2016/0037963 | A1 * | 2/2016 | Tuchrelo | ................. | A47J 31/60 222/148 |
| 2016/0095475 | A1 * | 4/2016 | Brennan | ............... | A23N 12/02 134/18 |
| 2016/0193615 | A1 * | 7/2016 | Schmid | ................. | B01L 3/0293 222/1 |
| 2016/0368782 | A1 * | 12/2016 | Yokoi | ..................... | C02F 1/008 |
| 2017/0173204 | A1 * | 6/2017 | Temple | ................... | A61L 9/145 |
| 2017/0268910 | A1 * | 9/2017 | Schneider | ............. | G01D 11/30 |
| 2017/0322068 | A1 * | 11/2017 | Gueller | ................... | G01G 17/06 |
| 2018/0031591 | A1 * | 2/2018 | Yaita | ...................... | G01F 23/26 |
| 2018/0286705 | A1 * | 10/2018 | Barros | ............ | H01L 21/67017 |

OTHER PUBLICATIONS

Mettler Toledo, "Retractable housings InTrac 781 / 784—Versatile and Rugged" 8 2016, pp. 8 downloaded from the internet at https://www.mt.com/dam/non-indexed/po/pro/pdf/ff/housing/FF_InTrac78x_en_30283317_Aug16.pdf (Year: 2016).*

* cited by examiner

ADDITIVE DELIVERY SYSTEM WITH SENSORS

CROSS-REFERENCES TO RELATED APPLICATIONS

This application claims the benefit of U.S. provisional application No. 62/370,417, filed Aug. 3, 2016 and titled "Light Array," and claims the benefit of U.S. provisional application No. 62/370,394, filed Aug. 3, 2016, and titled "Sensor Wand," the contents of all of which are incorporated herein by reference in their entirety for all purposes.

FIELD OF THE INVENTION

The present invention generally pertains to a method and apparatus for dispensing additives into a fluidic material, and more particularly to a method and apparatus for dispensing and sensing additives into a fluidic material.

BACKGROUND OF THE INVENTION

There exists many Laboratory, Scientific Research, Industrial, and Consumer Applications with processes that span Chemical, Agricultural, Pharmaceutical, Biological, Water Treatment, Oceanographic, Food, Beverage and Pool Industries that may use a fluidic chemical recipe formulation, delivery of chemical constituents with measurement sensing and feedback control of Chemical parameters such as pH, Electrical Conductivity, Temperature, Turbidity, Dissolved Gas, Redox and other ionic parameters to ensure integrity and safety of product. While many efforts have attempted to advance the sensing of such parameters the state of the art has had few significant advances in sensor elements since the development of the first ionic measurement techniques. Sensors immersed into fluidic environments have multiple routes of fouling that will make such measurements erroneous regardless of the type of sensing element used. Such fouling and sensing impairment is realized from such things as biofilm growth on sensing elements, precipitating salt buildup on sensing elements, measured solution clinging to sensing element, among others. Erroneous values from contaminated sensors can cause a loss of integrity or quality in the formulated product and realize large monetary losses from erroneous chemical formulations made from such erroneous measurements or from significant costs for periodic manual maintenance of such sensing elements for ensuring quality measurement values.

BRIEF SUMMARY OF THE INVENTION

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes an additive management system, including: an additive selection system, configured to select one of a plurality of additives for dispensing into a working fluid. The additive management system also includes an additive dispensing system, including a fluid sensing chamber including one or more fluid parameter sensors. The additive management system also includes an additive delivery system, configured to deliver the selected additive to the additive dispensing system. The additive management system also includes a processor configured to cause the fluid sensing chamber to receive a sample of the working fluid, to receive working fluid measurement signals from the one or more fluid parameter sensors corresponding with values of fluid parameters of the working fluid, and to determine one or more values for one or more fluid parameters of the working fluid based on the received working fluid measurement signals. The additive management system also includes where the processor is further configured to cause the additive delivery system to deliver the selected additive to the additive dispensing system and to cause the additive dispensing system to dispense the selected additive into the working fluid through the fluid sensing chamber. Other embodiments of this aspect include corresponding computer systems, apparatus, and computer programs recorded on one or more computer storage devices, each configured to perform the actions of the methods.

Implementations may include one or more of the following features. The additive management system where the processor is configured to cause at least a portion of the fluid sensing chamber to move with respect to the working fluid to fluidly connect the fluid sensing chamber with the working fluid. The additive management system where the processor is configured to isolate the fluid sensing chamber from the working fluid by causing at least a portion of the fluid sensing chamber to move with respect to the working fluid. The additive management system where the processor is further configured to determine an additive for dispensing into the working fluid based on the one or more values for the one or more fluid parameters of the working fluid. The additive management system where the processor is further configured to cause the additive selection system to select the determined additive. The additive management system where the processor is configured to cause the fluid sensing chamber to receive the selected additive, to receive additive measurement signals from the one or more fluid parameter sensors corresponding with the values of fluid parameters of the selected additive, and to determine one or more values for one or more fluid parameters of the selected additive based on the received additive measurement signals. The additive management system further including an extraction tube configured to extract the selected additive from the fluid sensing chamber. The additive management system further including one or more nozzles configured to clean the fluid parameter sensors with a cleaning fluid. The additive management system further including a level sensor, where the processor is configured to determine a level of the working fluid based on a level signal from the level sensor. The additive management system where the fluid parameters include one or more of pH, electrical conductivity, temperature, turbidity, dissolved gas, and redox. Implementations of the described techniques may include hardware, a method or process, or computer software on a computer-accessible medium.

One general aspect includes a method of operating an additive management system, the additive management system including: an additive selection system, configured to select one of a plurality of additives for dispensing into a working fluid, an additive dispensing system, including a fluid sensing chamber including one or more fluid parameter sensors, and an additive delivery system, configured to deliver the selected additive to the additive dispensing system. The method includes causing the fluid sensing chamber to receive a sample of the working fluid. The method also includes determining one or more values for one or more fluid parameters of the working fluid based on signals from the sensors. The method also includes selecting an additive for dispensing into the working fluid based on the one or more values for the one or more fluid parameters of the working fluid. The method also includes causing the additive dispensing system to dispense the selected additive into the working fluid through the fluid sensing chamber. Other embodiments of this aspect include corresponding computer systems, apparatus, and computer programs recorded on one or more computer storage devices, each configured to perform the actions of the methods.

Implementations may include one or more of the following features. The method may also include causing the fluid sensing chamber to receive the selected additive. The method may also include receiving additive measurement signals from the one or more fluid parameter sensors corresponding with the values of fluid parameters of the selected additive. The method may also include determining one or more values for one or more fluid parameters of the selected additive based on the received additive measurement signals. The method extracting the selected additive from the fluid sensing chamber. The method further including spraying a cleaning fluid on the sensors. The method further including: delivering a calibration fluid to the fluid sensing chamber. The method may also include determining one or more values for one or more fluid parameters of the calibration fluid based on signals from the sensors. The method further including determining a level of the working fluid based on a level signal from a level sensor. The method where the fluid parameters include one or more of pH, electrical conductivity, temperature, turbidity, dissolved gas, and redox. The method where the method is performed periodically. The method further including, causing at least a portion of the fluid sensing chamber to move with respect to the working fluid to fluidly connect the fluid sensing chamber with the working fluid. The method further including, causing at least a portion of the fluid sensing chamber to move with respect to the working fluid to fluidly isolate the fluid sensing chamber from the working fluid. Implementations of the described techniques may include hardware, a method or process, or computer software on a computer-accessible medium.

One general aspect includes a method of operating an additive management system, the additive management system including: an additive selection system, configured to select one of a plurality of additives for dispensing into a working fluid, an additive dispensing system, including a fluid sensing chamber including one or more fluid parameter sensors, and an additive delivery system, configured to deliver the selected additive to the additive dispensing system, the method including. The method also includes attaching a container of additive to the additive selection system. The method also includes causing the fluid sensing chamber to receive a sample of the additive from the container. The method also includes determining one or more values for one or more fluid parameters of the additive based on signals from the sensors. The method also includes comparing the one or more values with corresponding values of an expected additive. The method also includes generating an indication of whether the additive is correct based on the comparison. Other embodiments of this aspect include corresponding computer systems, apparatus, and computer programs recorded on one or more computer storage devices, each configured to perform the actions of the methods.

Implementations may include one or more of the following features. The method where causing the fluid sensing chamber to receive the sample of the additive from the container, determining the one or more values, comparing the one or more values with corresponding values of the expected additive, and generating the indication are automatically performed in response to attaching the container of additive to the additive selection system. The method where causing the fluid sensing chamber to receive the sample of the additive, determining the one or more values, comparing the one or more values with corresponding values of the expected additive, and generating the indication are automatically performed in response to an indication from a user. The method where the fluid parameters include one or more of pH, electrical conductivity, temperature, turbidity, dissolved gas, and redox. Implementations of the described techniques may include hardware, a method or process, or computer software on a computer-accessible medium.

DETAILED DESCRIPTION OF THE INVENTION

Particular embodiments of the invention are illustrated herein in conjunction with the drawings.

Various details are set forth herein as they relate to certain embodiments. However, the invention can also be implemented in ways which are different from those described herein. Modifications can be made to the discussed embodiments by those skilled in the art without departing from the invention. Therefore, the invention is not limited to particular embodiments disclosed herein.

Various industries use a working reservoir, or piping to hold a working fluid which performs one or more functions related to the use of the working fluid. For example, a working fluid in a biological application may provide nutrients to cells in an environment fluidly connected with a working reservoir. In an agricultural application, a working reservoir may hold a hydroponic working fluid used to provide nutrients to one or more plants. In water treatment applications, the working fluid may be drinking water. Numerous other applications use working fluids held in working reservoirs.

Various solutions have been developed for in-place cleaning and calibrating of sensors for various applications, but none address the need for chemical recipe formulation dosing into the working fluid as an integrated in place self-cleaning and calibrating multi-sensing dispensing unit. There is a benefit to delivering the additives into the working fluid using the same chamber as that used for sensing the working fluid prior to the delivery. There is also a benefit to in-place cleaning, calibration, and sterilization of sensors elements in the sensing chamber in a single system. There is also a significant benefit for chemical formulation in a pre-delivery reservoir where sensing of formulated constituents can occur prior to delivery so that formulation integrity can be confirmed and where the sensing, formulation, and delivery system has the ability to be easily upgraded to include sterilization and additional sensing or actuating elements such as a camera and fluidic level sensing element for viewing and determining depth of the working fluid in the working reservoir.

Figure 1:
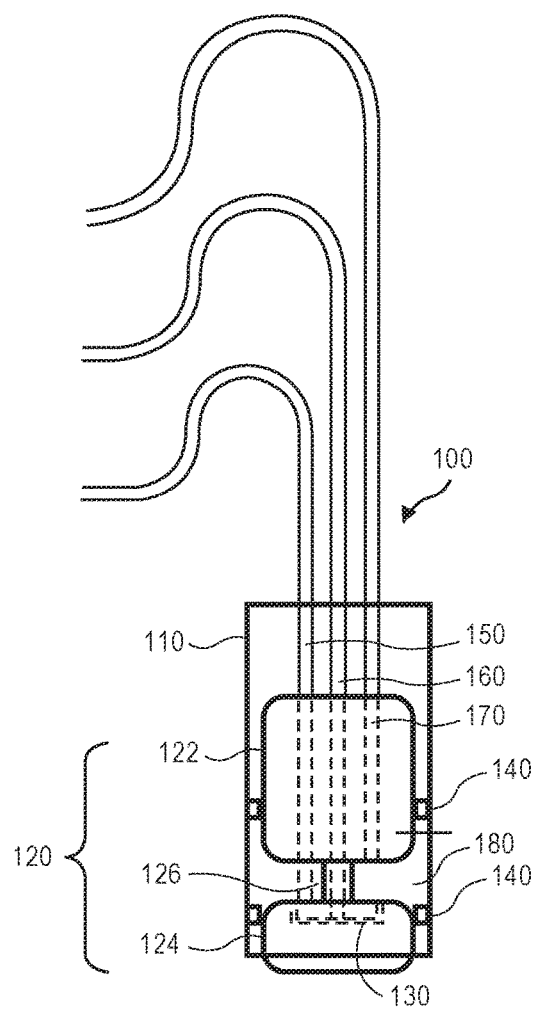
FIG. 1 is schematic cross-sectional view of a dispensing system according to an embodiment in a first functional position.
Figure 2:
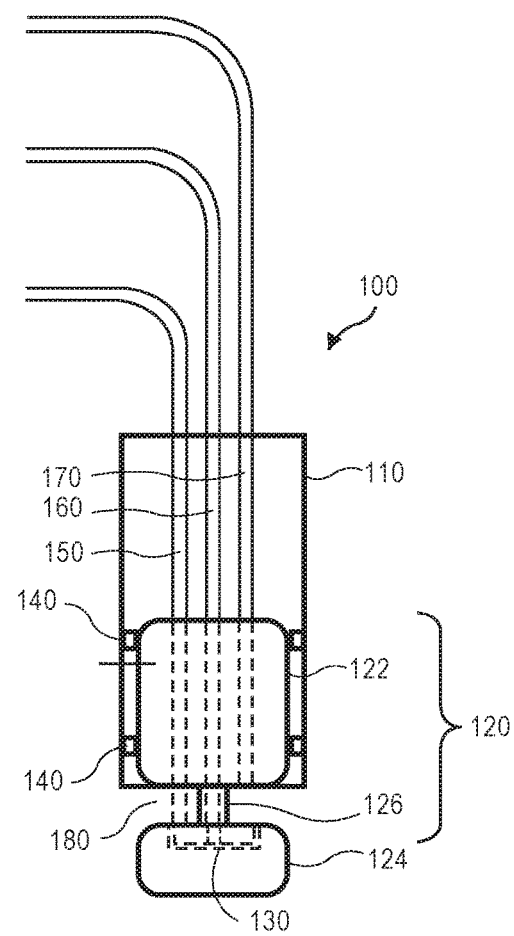
FIG. 2 is schematic cross-sectional view of a dispensing system according to an embodiment in a second functional position.

FIGS. 1 and 2 are schematic cross-sectional views of a dispensing system 100 according to an embodiment.

Dispensing system 100, as illustrated in FIGS. 1 and 2, includes housing 110 and sensing head 120 which is movable with respect to housing 110. As discussed in further detail below, sensing head 120 is configured to move within housing 110.

Sensing head 120 includes sensing head top 122, sensing head bottom 124, and sensing head connector 126, which mechanically connects sensing head bottom 124 and sensing head top 122. Sensing head connector 126 also forms a fluid connection port between sensing head bottom 124 and sensing at top 122. The gap between sensing head top 122 and sensing head bottom 124 partially defines a fluid sensing chamber 180. Various sensors may, for example, be connected to sensing head top 122 so as to be configured to sense fluids in the fluid sensing chamber 180. In some embodiments, sensors may alternatively or additionally be connected to sensing head bottom 124.

In some embodiments, one or more sensors are partially connected to sensing head top 122 and are partially connected to sensing head bottom 124. For example, a turbidity sensor may include an LED and a phototransistor, where the LED is connected to sensing head bottom 124 and the phototransistor is connected to sensing head top 122.

Dispensing system 100 also includes delivery/extract tube 150 and vent/bulk solution dispense tube 170.

Delivery/extract tube 150 is configured to be used for delivery and extraction of fluids to fluid sensing chamber 180. As illustrated, delivery/extract tube 150 extends through sensing head top 122 to a position near sensing head bottom 124.

Vent/bulk solution dispense tube 170 may be used as a vent during delivery and extraction of fluids to fluid sensing chamber 180. Vent/bulk solution dispense tube 170 may additionally be used to deliver fluids to fluid sensing chamber 180, as discussed in further detail below.

Using delivery/extract tube 150 a fluid may be delivered to fluid sensing chamber 180 by pumping the fluid through delivery/extract tube 150 from an additive delivery system, for example, such as that discussed below. While using delivery/extract tube 150 to deliver the fluid to fluid sensing chamber 180, vent/bulk solution dispense tube 170 may provide a venting path to allow the fluid to be delivered to fluid sensing chamber 180.

Alternatively, to deliver a fluid to fluid sensing chamber 180, a negative pressure may be induced in fluid sensing chamber 180 using vent/bulk solution dispense tube 170. In response of the negative pressure the delivered fluid may flow through delivery/extract tube 150 to fluid sensing chamber 180.

Using delivery/extract tube 150 a fluid may be extracted from fluid sensing chamber 180 by pumping the fluid through delivery/extract tube 150 to the additive delivery system, for example, such as that discussed below. While using delivery/extract tube 150 to extract the fluid from fluid sensing chamber 180, vent/bulk solution dispense tube 170 may provide a venting path to allow the fluid to be extracted from fluid sensing chamber 180.

Alternatively, to extract a fluid from fluid sensing chamber 180, a positive pressure may be induced in fluid sensing chamber 180 using vent/bulk solution dispense tube 170. In response of the positive pressure the fluid may flow from fluid sensing chamber 180 through delivery/extract tube 150.

Sensors connected to sensing head top 122 may be used to sense various characteristics of the fluid delivered to fluid sensing chamber 180. For example, pH, Electrical Conductivity, Temperature, Turbidity, Dissolved Gas, Redox and other ionic parameters may be sensed, for example, to determine identity, concentration, or other parameters. The sensors may have any of ionic, thermometric, conductive, inductive, and capacitive sensing technology.

Sensing head bottom 124 includes spray fluid port 130, discussed in further detail below. Spray fluid port 130 is connected to spray tube 160, which is configured to deliver a spraying fluid to spray fluid port 130. Spray fluid port 130 is configured to deliver the spraying fluid to nozzles integrated with or connected to sensing head bottom 124. The nozzles are configured to spray the spraying fluid within fluid sensing chamber 180. The spraying fluid may, for example, be used to clean fluid sensing chamber 180 and/or the sensors connected to sensing head top 122.

As illustrated in FIG. 1, sensing head 120 is positioned such that fluid sensing chamber 180 is closed and is defined substantially by sensing head top 122, sensing head bottom 124, sensing head connector 126, housing 110, and sealing and guiding structure 140.

As illustrated in FIG. 2, sensing head 120 is positioned such that fluid sensing chamber 180 is open end is exposed to the environment outside of housing 110. To selectively position sensing head 120, sensing head 120 may be connected to an electronic actuator (not shown). The electronic actuator may include a motor and may be configured to receive power and/or signals which cause the motor to selectively position sensing head 120 according to the power and/or signals, for example, in either of the positions illustrated in FIGS. 1 and 2.

In some embodiments, one or more accessories may be attached to or incorporated into sensing head 120.

For example, a level sensor may be attached to or incorporated into sensing head bottom 124. The level sensor may have a cavity and a pressure sensor configured to sensed pressure of the cavity. The cavity may have a port to finding a path between the cavity and an external environment. When the sensing head bottom 124 is submerged, for example, in a working fluid, the cavity may form a bell, such that the pressure within the cavity corresponds with a depth of the sensing head bottom 124. The pressure sensor of the level sensor and provide a signal to a processor, which uses the signal to calculate a level or depth of the working fluid.

Additionally or alternatively, a camera may be attached to or incorporated into sensing head 120. The camera may be used to take pictures or video of the sensing head, for example, while in use. The camera may also be used to take pictures or video of a fluid in fluid sensing chamber 180 or in the working fluid.

Additionally or alternatively, a mechanical brush may be attached to or incorporated into sensing head 120. The mechanical brush may be used to clean one or more portions of dispensing system 100. For example, the mechanical brush may be driven by a motor in communication with a processor, and may be used to clean one or more sensors and or other surfaces defining fluid sensing chamber 180.

Figure 3:
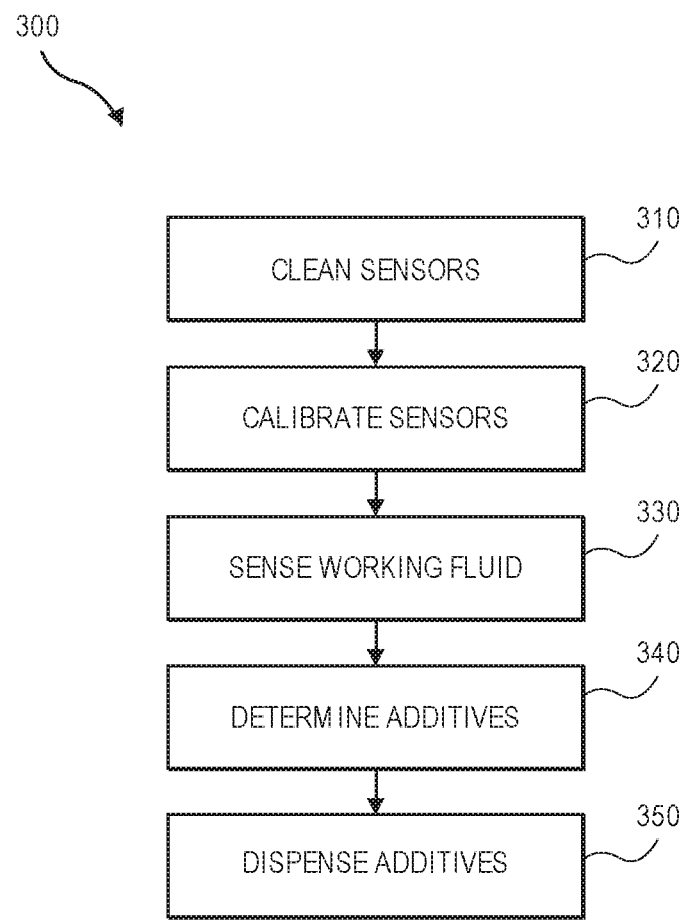
FIG. 3 is a flowchart diagram of a method of using a dispensing system.

FIG. 3 is a flowchart diagram of a method 300 of using a dispensing system, such as those described with reference to FIGS. 1 and 2, and elsewhere herein.

At 310, the sensors on sensing head top 122 are cleaned. For example, a cleaning fluid may be pumped through spray tube 160, through spray fluid port 130, and through the nozzles in sensing head bottom 124. As a result, the sensors on sensing head top 122 are sprayed with the cleaning fluid by the nozzles in sensing head bottom 124.

Cleaning the sensors on sensing top 122 may additionally include removing the cleaning fluid from fluid sensing chamber 180 with delivery/extract tube 150, for example, by using a pump connected with delivery/extract tube 150 and/or by applying a positive pressure to fluid sensing chamber 180 with vent/bulk solution dispense tube 170.

In some embodiments, one or more additional cleaning fluids may be sprayed on the sensors. In addition, the one or more additional cleaning fluids may be removed from the fluid sensing chamber.

Cleaning the sensors on sensing top 122 may additionally include rinsing the sensors and/or the fluid sensing chamber 180 with the rinsing fluid, such as water. For example, a rinsing fluid may be pumped through spray tube 160, through spray fluid port 130, and through the nozzles in sensing head bottom 124. As a result, the sensors on sensing head top 122 are sprayed with the rinsing fluid by the nozzles in sensing head bottom 124.

The sensors and/or the fluid sensing chamber 180 may be rinsed before and/or after any or all of the cleaning fluid applications.

Cleaning the sensors on sensing top 122 may additionally include drying the sensors and/or the fluid sensing chamber 180 with a drying fluid, such as air. For example, a drying fluid may be pumped through spray tube 160, through spray fluid port 130, and through the nozzles in sensing head bottom 124. As a result, the sensors on sensing head top 122 are exposed to the drying fluid from the nozzles in sensing head bottom 124. Alternatively or additionally, the drying fluid may be delivered to fluid sensing chamber 180 using either or both of delivery/extract tube 150 and vent/bulk solution dispense tube 170.

In some embodiments of method 300, the sensors on sensing head top 122 are not cleaned, and 310 is skipped.

At 320, the sensors on sensing top 122 are calibrated. Calibrating the sensors may include delivering a calibration fluid to the sensors. For example, a calibration fluid may be pumped through spray tube 160, through spray fluid port 130, and through the nozzles in sensing head bottom 124. As a result, the sensors on sensing head top 122 are sprayed with the calibration fluid by the nozzles in sensing head bottom 124. Alternatively or additionally, a calibration fluid may be delivered to fluid sensing chamber 180 using either or both of delivery/extract tube 150 and vent/bulk solution dispense tube 170.

Calibrating the sensors may also include using the sensors to measure a value for a characteristic of the calibration fluid. Because an actual value of the measured characteristic of the calibration fluid is known, the difference between the actual value of the measured characteristic and the measured value of the measured characteristic may be determined. The difference between the actual value and the measured value of the measured characteristic may be used to adjust or correct measured values of the characteristic for fluids for which the actual value is not known, as is understood by those of skill in the art.

In some embodiments, the difference between the actual value and the measured value of the measured characteristic may be stored in a memory, and may be compared with differences between actual and measured values as previously measured. Changes over time in the difference greater the threshold an a may be used as an indication that a sensor should be replaced.

In some embodiments, calibrating the sensors may also include cleaning the sensors and/or fluid sensing chamber 180, for example, using a method having aspects described above.

In some embodiments of method 300, the sensors on sensing head top 122 are not calibrated, and 320 is skipped.

At 330, characteristics of a working fluid in a working reservoir may be sensed using the sensors in sensing head top 122. For example, the sensing head 120 may be positioned as illustrated in FIG. 2, such that the sensors in sensing head top 122 are exposed to the working fluid. Alternatively, a sample of the working fluid may be provided to fluid sensing chamber 180 with the sensing head 120 positioned in either of the positions illustrated in FIGS. 1 and 2. Once exposed to the working fluid, the sensors in sensing head top 122 may be used to measure one or more values for one or more characteristics of the working fluid. As discussed above, the measured values may be adjusted based on the results of the sensor calibration to determine one or more values for the one or more characteristics of the working fluid.

At 340, one or more additives may be selected based on the determined one or more values for the one or more characteristics of the working fluid. In addition, concentrations or amounts for the one or more additives may be determined based on the determined one or more values for the one or more characteristics of the working fluid.

At 350, the selected one or more additives are dispensed into the working fluid.

In some embodiments, the selected one of more additives are dispensed into the working fluid while the sensing head 120 is positioned as shown in FIG. 2 by using any one or more of the delivery/extract tube 150, the vent/bulk solution dispense tube 170, and the spray tube 160.

Alternatively, the selected one of more additives may be dispensed into the fluid sensing chamber 180 while the sensing head 120 is positioned as shown in FIG. 1 by using any one or more of the delivery/extract tube 150, the vent/bulk solution dispense tube 170, and the spray tube 160. In some embodiments, the sensors may be used to verify that the additives are correct. The selected one of more additives may be dispensed into the working fluid by repositioning the sensing head 120 to the position shown in FIG. 2.

In some embodiments, the method 300 is performed periodically. For example, in some embodiments, the method 300 is performed every 30 seconds, minute, 2 minutes, 5 minutes, 10 minutes, 15 minutes, 30 minutes, 60 minutes, 90 minutes, 120 minutes, 3 hours, 6 hours, 8 hours, 12 hours, 24 hours, 2 days, 3 days, 5 days, 7 days, 2 weeks, 3 weeks, month, or another time.

Figure 4:
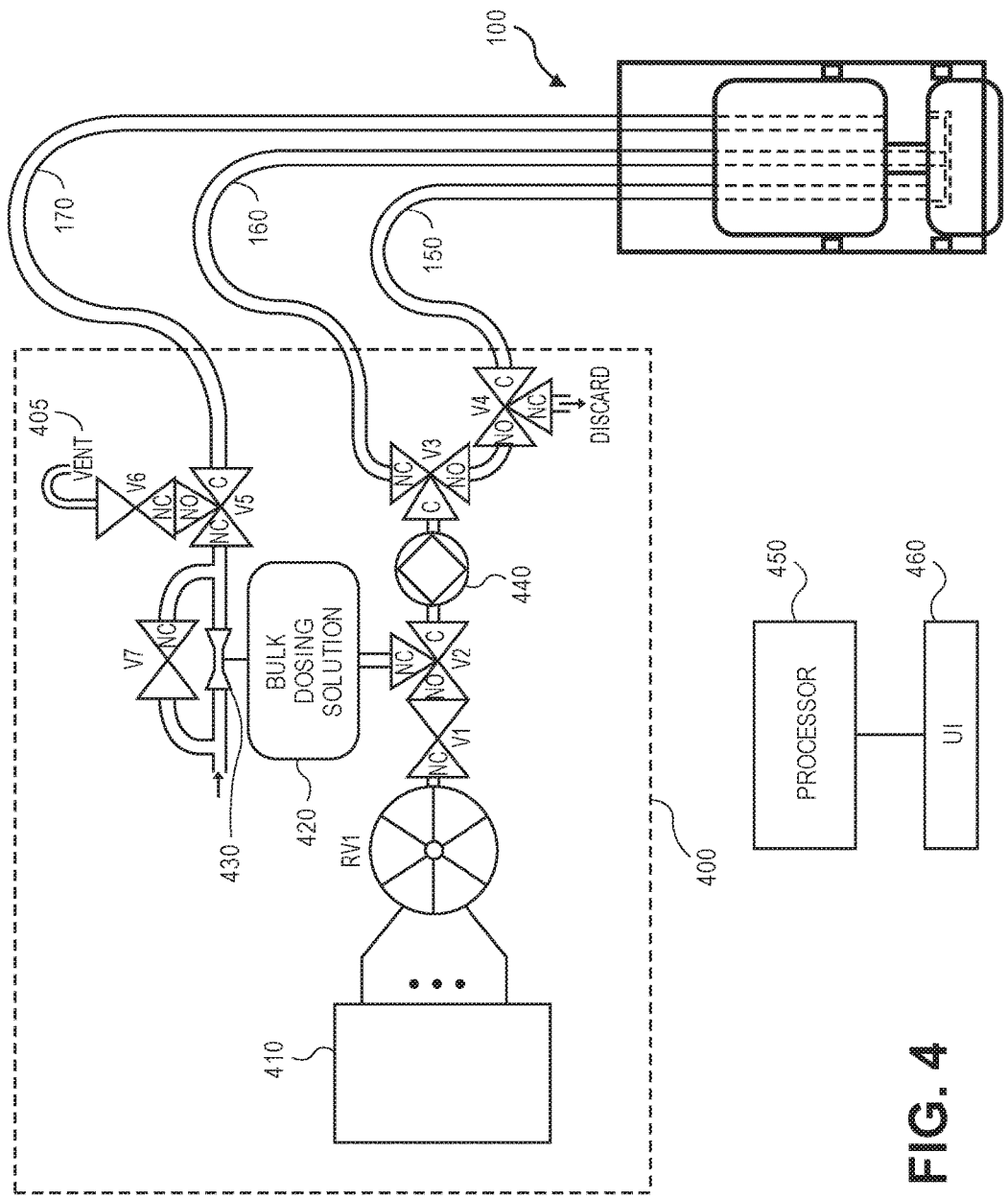
FIG. 4 is a schematic cross-sectional view of the dispensing system of FIGS. 1 and 2 connected to an additive delivery system.

FIG. 4 is a schematic cross-sectional view of the dispensing system of FIGS. 1 and 2 connected to an additive delivery system 400.

Additive delivery system 400 is configured to control fluid flow to and from dispensing system 100. For example, additive delivery system 400 may be configured to cause dispensing system 100 to perform the functions discussed above with reference to FIG. 3 in response to control signals from processor 550.

Additive delivery system 400 includes additive selection system 410, rotary valve RV1, bulk dosing solution tank 420, Venturi mixer 430, pump 440, and valves V1-V7.

Additive selection system 410 is configured to dispense various additives through rotary valve RV1 according to the on/off state of valve V1, as determined by processor 450. Which of the various additives is dispensed may be selected based on the position or state of rotary valve RV1, as determined by processor 450. The selected additive is directed to either the bulk dosing solution tank 420 or pump 440, according to the state of valve V2, as determined by processor 450.

Pump 440 generates pressures which cause the selected additive directed thereto to flow into dispensing system 100 through either delivery/extract tube 150 or the spray tube 160, according to the states of valves V3 and V4, as determined by processor 450. Pump 440 may be uni-directional or may by bi-directional. In some embodiments, pump 440 is peristaltic.

The selected additive directed to the bulk dosing solution tank 420 may flow into dispensing system 100 through Venturi mixer 430, valve V5, and vent/bulk solution dispense tube 170, according to the states of valves V5, V6, and V7. A fluid, such as water, may be pumped through Venturi mixer 430, receive the selected additive from the bulk dosing solution tank 420, and carry the selected additive into dispensing system 100 through vent/bulk solution dispense tube 170. Alternatively, the fluid may bypass Venturi mixer 430 if valve V7 is opened by processor 450. Vent/bulk solution dispense tube 170 functions to vent dispensing system 100 is valves V5 and V6 provide a fluid path to vent opening 405.

In some embodiments, the bulk dosing solution tank 420, Venturi mixer 430, and valves V5, V6, and V7 are omitted. In such embodiments, vent/bulk solution dispense tube 170 may be open ended as a vent for dispensing system 100.

Processor 450 is configured to receive signals from the sensors on the sensing head top of dispensing system 100; from one or more sensors of any of the actuator of dispensing system 100, the additive delivery system 400, and the components of additive delivery system 400; and from user interface 460, for example, generated in response to actions by a user. In response to the received signals, processor 450 is configured to determine desired states of the components of additive delivery system 400 and generates the control signals for the components of additive delivery system 400 causing the components to be in the desired states.

Figure 5:
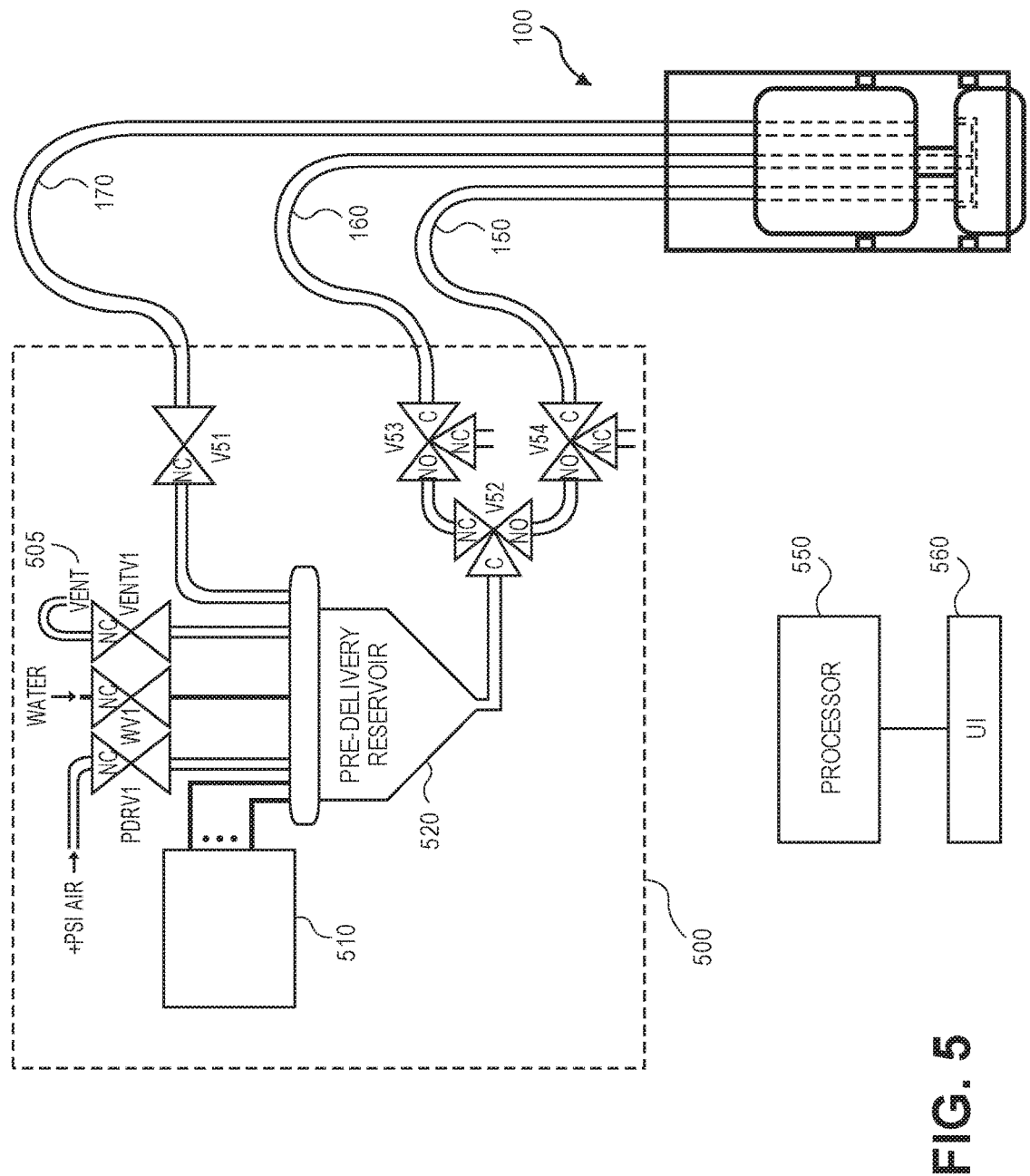
FIG. 5 is a schematic cross-sectional view of the dispensing system of FIGS. 1 and 2 connected to an alternative additive delivery system.

FIG. 5 is a schematic cross-sectional view of the dispensing system of FIGS. 1 and 2 connected to an alternative additive delivery system 500.

Additive delivery system 500 is configured to control fluid flow to and from dispensing system 100. For example, additive delivery system 500 may be configured to cause dispensing system 100 to perform the functions discussed above with reference to FIG. 3 in response to control signals from processor 550.

Additive delivery system 500 includes additive selection system 510, pre-delivery reservoir 520, pre-delivery reservoir valve PDRV1, water valve WV1, vent valve VentV1, and valves V51-V54.

Additive selection system 510 is configured to dispense various additives to pre-delivery reservoir 520. Which of the various additives is or are dispensed may be selected the additive selection system 510, as determined by processor 550.

In pre-delivery reservoir 520, one or more additives may be mixed together and/or may be mixed with water from water valve WV1 having a state determined by processor 550.

According to the states of pre-delivery reservoir valve PDRV1, vent valve VentV1, and valves V51-V54, as determined by processor 550, air from pre-delivery reservoir valve PDRV1 may be forced into dispensing system 100 through any one or more of delivery/extract tube 150, the spray tube 160, and vent/bulk solution dispense tube 170, and may be vented through any other one or more of delivery/extract tube 150 or the spray tube 160, and vent/bulk solution dispense tube 170.

The selected additive directed to the pre-delivery reservoir 520 and or water from water valve WV1 may flow into dispensing system 100 through valve V52, and through either or both of delivery/extract tube 150 and the spray tube 160, according to the states of valves V52, V53, and V54, as determined by processor 550. In some embodiments, the selected additive directed to the pre-delivery reservoir 520 and or water from water valve WV1 may flow into dispensing system 100 is influenced by gravity. Alternatively, the selected additive directed to the pre-delivery reservoir 520 and or water from water valve WV1 may be caused to flow into dispensing system 100 by the air pressure from pre-delivery reservoir valve PDRV1.

As determined by processor 550, the state of vent valve VentV1 is controlled so that air may vent from the pre-delivery reservoir 520 to vent opening 505.

Processor 550 is configured to receive signals from the sensors on the sensing head top of dispensing system 100; from one or more sensors of any of the actuator of dispensing system 100, the additive delivery system 500, and the components of additive delivery system 500; and from user interface 560, for example, generated in response to actions by a user. In response to the received signals, processor 550 is configured to determine desired states of the components of additive delivery system 500 and generates the control signals for the components of additive delivery system 500 causing the components to be in the desired states.

Figure 6:
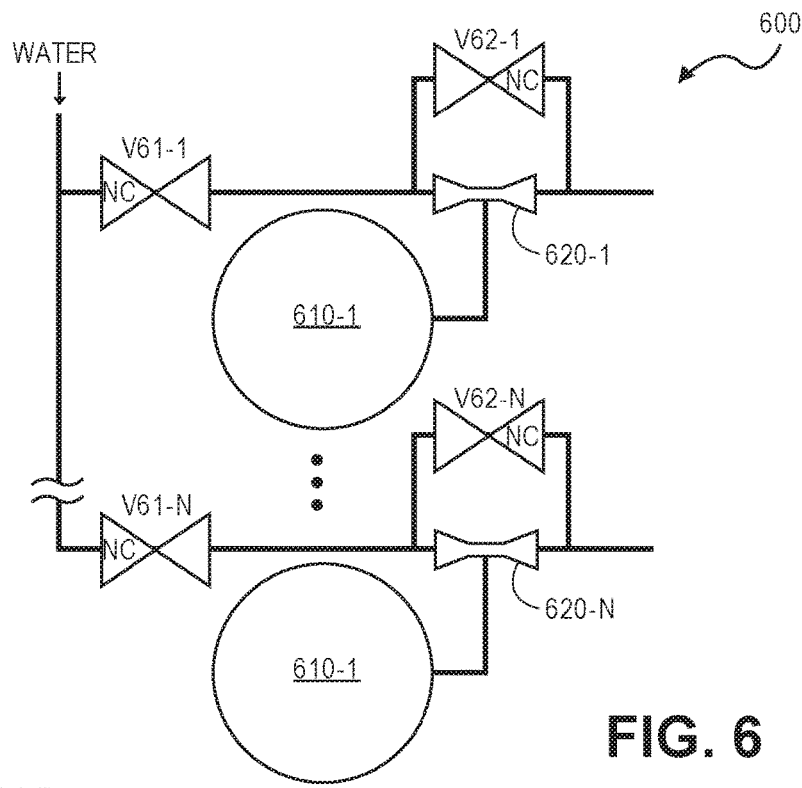
FIG. 6 is an additive selection system according to an embodiment.

FIG. 6 is an additive selection system 600 according to an embodiment. Additive selection system 600 may be used, for example, in any of the additive delivery systems discussed herein.

Additive selection system 600 includes N additive segments, where each additive segment includes an additive container 610, valves V61 and V62, and a Venturi mixer 620.

As determined by a processor, the state of valve V61 of each particular additive segment determines whether water flows through the particular additive segment. As determined by the processor, the state of valve V62 of each of the additive segments determines whether water flowing therethrough is dosed with the additive of the additive container 610.

Figure 7:
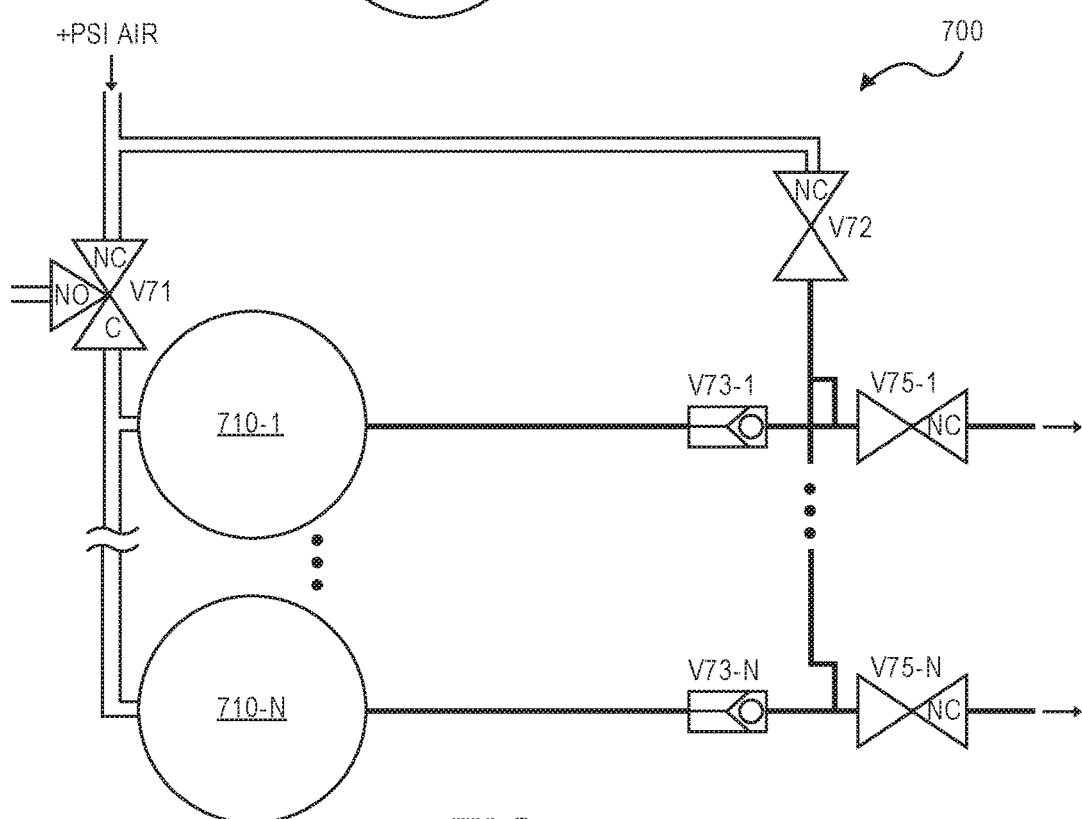
FIG. 7 is an additive selection system according to an embodiment.

FIG. 7 is an additive selection system 700 according to an embodiment. Additive selection system 700 may be used, for example, in any of the additive delivery systems discussed herein.

Additive selection system 700 includes N additive segments, where each additive segment includes an additive container 710, a check valve V73, and a valve V75. Additive selection system 700 also includes valves V71 and V72.

As determined by a processor, the state of valve V71 determines whether pressurized air presses against the additive containers 710, which are compliant. As determined by a processor, the state of valve V75 of each particular additive segment determines whether the additive in the additive container 710 flows through the particular additive segment.

As determined by the processor, the state of valve V72 and the state of valve V75 of each particular additive segment determines whether pressurized air passes to the output of the particular additive segment. When pressurized air passes through the output of a particular additive segment, any remaining additive is purged. The check valve V73 of each particular segment prevents the pressurized air from going into the additive container 710 of the particular segment.

Figure 8:
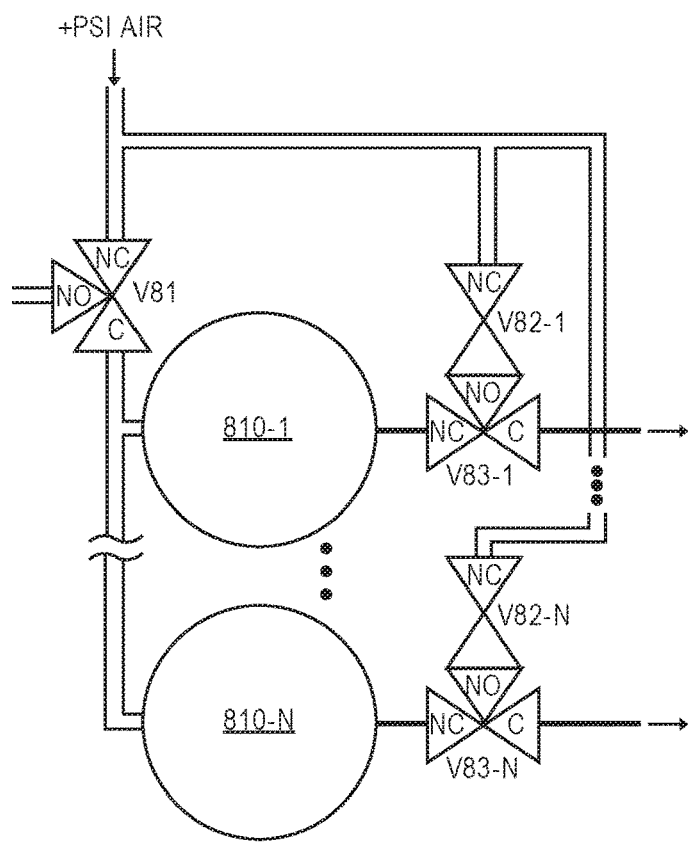
FIG. 8 is an additive selection system according to an embodiment.

FIG. 8 is an additive selection system 800 according to an embodiment. Additive selection system 800 may be used, for example, in any of the additive delivery systems discussed herein.

Additive selection system 800 includes N additive segments, where each additive segment includes an additive container 810, and valves V82 and V83. Additive selection system 800 also includes valve V81.

As determined by a processor, the state of valve V81 determines whether pressurized air presses against the compliant additive containers 810. As determined by a processor, the state of valve V83 of each particular additive segment determines whether the additive in the additive container 810 flows through the particular additive segment.

As determined by the processor, the state of valves V82 and V83 of each particular additive segment determines whether pressurized air passes to the output of the particular additive segment. When pressurized air passes through the output of a particular additive segment, any remaining additive is purged.

Figure 9:
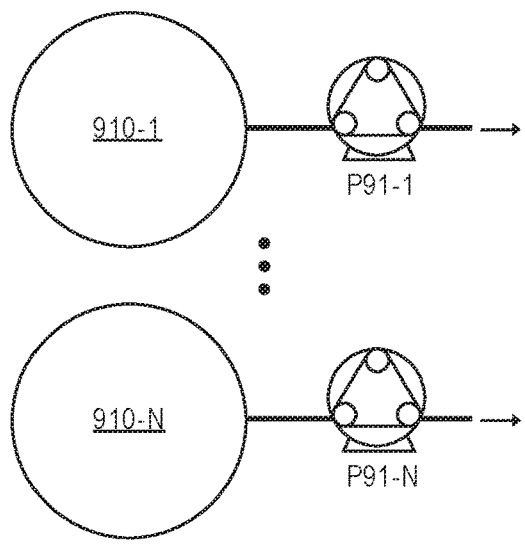
FIG. 9 is an additive selection system according to an embodiment.

FIG. 9 is an additive selection system 900 according to an embodiment. Additive selection system 900 may be used, for example, in any of the additive delivery systems discussed herein.

Additive selection system 900 includes N additive segments, where each additive segment includes an additive container 910 and a pump P91.

As determined by a processor, the on/off state of pump P91 of each particular segment determines whether the additive of the additive container of the particular segment flows through the pump P91. Pump P91 may be unidirectional or may by bi-directional. In some embodiments, pump P91 is peristaltic.

In some embodiments, as part of a process to connect a new additive container to an additive selection system of an additive delivery system, the additive of the new additive container may be tested to verify that the proper additive container has been connected.

For example, a sensor in the additive selection system may indicate to a processor that the new additive container has been connected. In response to the indication, the processor may cause the additive delivery system to deliver a sample of the additive to a dispensing system, where sensors are used to measure one or more characteristics of the sample, for example using a method similar or identical to those discussed above with reference to FIG. 3. If the measured characteristics of the sample are less than a threshold different from expected values the new additive is recognized as being correct. In some embodiments, the processor is configured to generate an audible or visual signal indicating whether the new additive is correct, for example by emitting a sound or illuminating and LED. Alternatively, the additive of the new additive container may be tested to verify that the proper additive container has been connected in response to an indication from a user, for example, using a user interface.

Though the present invention is disclosed by way of specific embodiments as described above, those embodiments are not intended to limit the present invention. Based on the methods and the technical aspects disclosed above, variations and changes may be made to the presented embodiments by those skilled in the art without departing from the spirit and the scope of the present invention.

What is claimed is:

1. An additive management system, comprising:
    an additive selection system, configured to select one of a plurality of additives for dispensing into a working fluid;
    an additive dispensing system, comprising a housing, and a sensing head moveably located within the housing, the sensing head comprising a sensing head top and a sensing head bottom, a fluid parameter sensor mounted on one of the sensing head top and the sensing head bottom, and at least one nozzle located in the other of the sensing head top and the sensing head bottom, the nozzle aimed at the fluid parameter sensor, wherein the housing and the sensing head together define a fluid sensing chamber;
    an additive delivery system, configured to deliver the selected additive to the additive dispensing system; and
    a processor configured to cause a portion of the sensing head to extend beyond the housing to thereby open the sensing chamber to cause the fluid sensing chamber to receive a sample of the working fluid and to cause a portion of the sensing head to retract into the housing to thereby close the sensing chamber, to receive working fluid measurement signals from the fluid parameter sensor corresponding with values of fluid parameters of the working fluid in the sensing chamber, and to determine one or more values for one or more fluid parameters of the working fluid based on the received working fluid measurement signals,
    wherein the processor is further configured to cause the additive delivery system to deliver the selected additive to the additive dispensing system and to cause the additive dispensing system to dispense the selected additive into the working fluid through the fluid sensing chamber.

2. The additive management system of claim 1, wherein the processor is further configured to determine an additive for dispensing into the working fluid based on the one or more values for the one or more fluid parameters of the working fluid.

3. The additive management system of claim 2, wherein the processor is further configured to cause the additive selection system to select the determined additive.

4. The additive management system of claim 1, wherein the processor is configured to cause the fluid sensing chamber to receive the selected additive, to receive additive measurement signals from the fluid parameter sensor corresponding with the values of fluid parameters of the selected additive, and to determine one or more values for one or more fluid parameters of the selected additive based on the received additive measurement signals.

5. The additive management system of claim 4, further comprising an extraction tube configured to extract the selected additive from the fluid sensing chamber.

6. The additive management system of claim 4, wherein the nozzle is configured to clean the fluid parameter sensor with a cleaning fluid.

7. The additive management system of claim 1, further comprising a level sensor, wherein the processor is configured to determine a level of the working fluid based on a level signal from the level sensor.

8. The additive management system of claim 1, wherein the fluid parameters include one or more of pH, electrical conductivity, temperature, turbidity, dissolved gas, and redox.

9. A method of operating an additive management system, the additive management system comprising:
- an additive selection system, configured to select one of a plurality of additives for dispensing into a working fluid,
- an additive dispensing system, comprising a housing, and a sensing head moveably located within the housing, the sensing head comprising a sensing head top and a sensing head bottom, a fluid parameter sensor mounted on one of the sensing head top and the sensing head bottom, and at least one nozzle on the other of the sensing head top and the sensing head bottom, the nozzle aimed at the fluid parameter sensor, wherein the housing and the sensing head together define a fluid sensing chamber, and
- an additive delivery system, configured to deliver the selected additive to the additive dispensing system, the method comprising:
- causing a portion of the sensing head to extend beyond the housing to thereby open the sensing chamber and receive a sample of the working fluid;
- causing the portion of the sensing head to retract into the housing to thereby close the sensing chamber; and
- determining one or more values for one or more fluid parameters of the working fluid in the sensing chamber based on signals from the fluid parameter sensor;
- selecting an additive for dispensing into the working fluid based on the one or more values for the one or more fluid parameters of the working fluid;
- causing the additive dispensing system to dispense the selected additive into the working fluid through the fluid sensing chamber.

10. The method of claim 9, further comprising:
- causing the fluid sensing chamber to receive the selected additive;
- receiving additive measurement signals from the fluid parameter sensor corresponding with the values of fluid parameters of the selected additive; and
- determining one or more values for one or more fluid parameters of the selected additive based on the received additive measurement signals.

11. The method of claim 10, extracting the selected additive from the fluid sensing chamber.

12. The method of claim 10, further comprising spraying a cleaning fluid on the fluid parameter sensor with the nozzle.

13. The method of claim 9, further comprising:
- delivering a calibration fluid to the fluid sensing chamber; and
- determining one or more values for one or more fluid parameters of the calibration fluid based on signals from the fluid parameter sensor.

14. The method of claim 9, further comprising determining a level of the working fluid based on a level signal from a level sensor.

15. The method of claim 9, wherein the fluid parameters include one or more of pH, electrical conductivity, temperature, turbidity, dissolved gas, and redox.

16. The method of claim 9, wherein the method is performed periodically.

17. The method of claim 9, wherein causing the portion of the sensing head to extend beyond the housing fluidly connects the fluid sensing chamber with the working fluid.

* * * * *